UNITED STATES PATENT OFFICE.

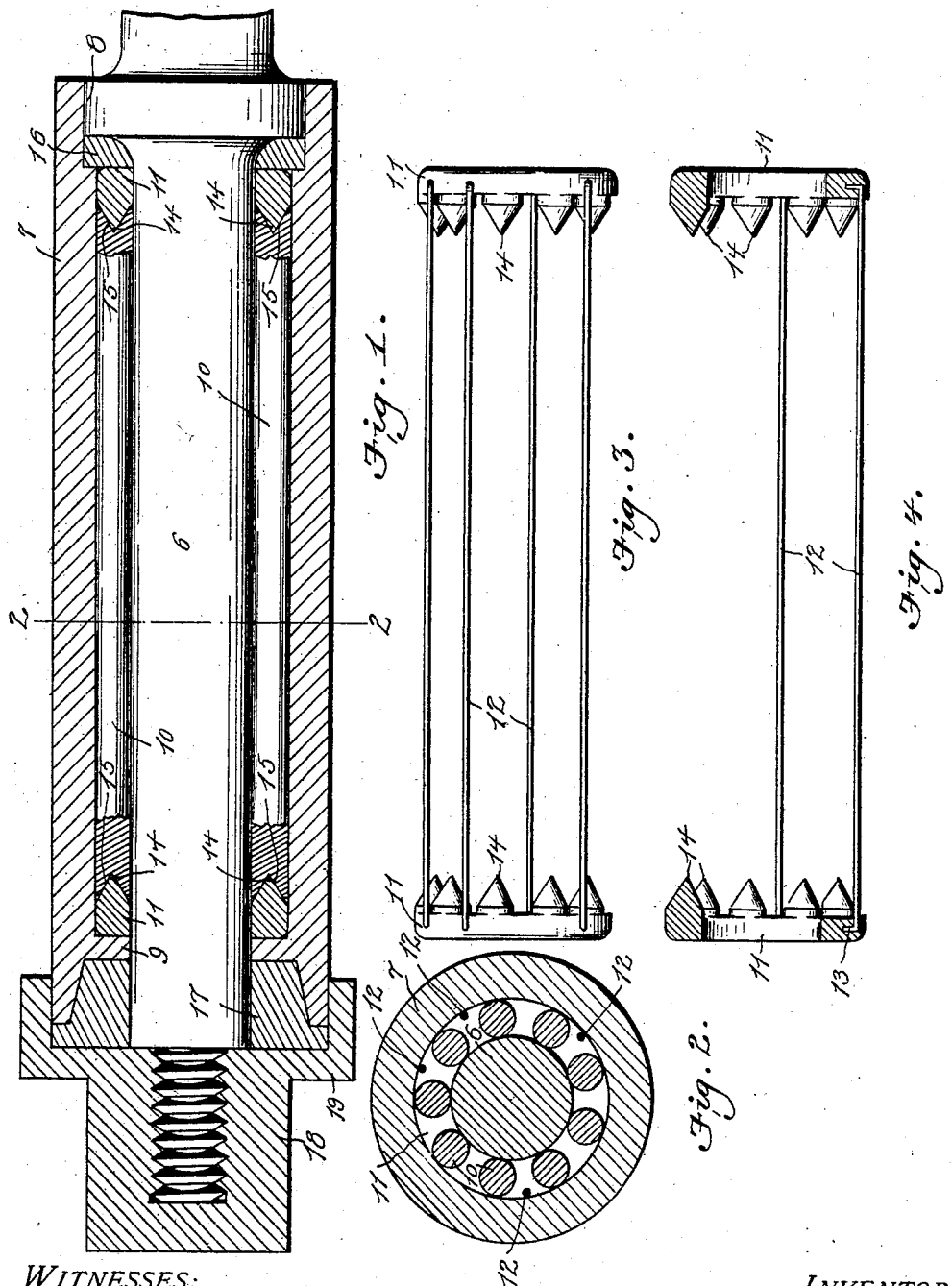

JULIUS HALMASI, OF CLEVELAND, OHIO.

ROLLER-BEARING.

No. 863,986.  Specification of Letters Patent.  Patented Aug. 20, 1907.

Application filed August 24, 1906. Serial No. 331,863.

*To all whom it may concern:*

Be it known that I, JULIUS HALMASI, a subject of Emperor Franz Joseph of Austria-Hungary, residing at Cleveland, in the county of Cuyahoga and State of Ohio, have invented new and useful Improvements in Roller-Bearings, of which the following is a specification.

This invention is an anti-friction bearing of the roller type, and particularly adapted for use on automobiles and other vehicles, and for heavy bearings generally.

The object of the invention is to form an improved device of the kind, the parts of which are few and simple and free from complications or weaknesses.

The bearings include a circular set of rollers which are held and spaced apart in a frame of novel construction, and this frame is held in place by a novel form of casing.

The invention is illustrated as applied to an axle, but may be used for other purposes.

In the accompanying drawings, Figure 1 is a longitudinal sectional view of the invention. Fig. 2 is a cross section, on the line 2—2 of Fig. 1. Fig. 3 is a side view of the roller frame. Fig. 4 is a section thereof.

Referring specifically to the drawings, 6 indicates the axle and 7 the axle box. The latter is counterbored at its inner end to receive the shoulder 8 of the axle, and at its outer end it has an inwardly-projecting annular flange 9, which extends close to the surface of the axle.

The rollers between the axle and the box are indicated at 10, and they are held in a cage or roller frame consisting of a pair of rings 11 which are connected and spaced by rods 12, of which there are a number, say four. The ends of these rods are turned in, as at 13, and let into sockets in the rings where they are soldered or brazed. The rods are set in far enough to lie within the circumference of the rings and so be out of contact with the bearing surface of the box. Each ring has a plurality of conical pivots or projections 14 which are arranged opposite to each other on the respective rings and project into corresponding conical depressions 15 in the ends of the rollers 10 at the axes thereof. This arrangement serves to space the rollers apart, to hold them in alinement, and to form bearings on which they turn.

The inner ring 11 backs against the leather washer 16 between the shoulder of the axle and the box, and the outer ring 11 backs against the annular flange 9 of the box. The roller frame and rollers are thus held in place and endwise movement prevented.

The outer end of the box is rendered oil-tight by a packing cone 17 set in a conical recess formed in the end of the box, and the parts are all held together by a nut 18 which screws on the end of the axle and has an annular flange 19 which fits over the outer end of the box and serves to help exclude dirt.

The box is formed in one piece, and yet it is so constructed that the axle, or both the axle and the bearings, can be taken out by unscrewing the cap nut. It is also substantially oil-tight, and oil supplied into the box from a lubricator or other source will be effectively retained therein.

I claim:

The combination of an axle box having an internal annular flange and a conical recess at the outer end, an axle in the box having an annular shoulder at the inner end and a screw at the outer end, a packing ring between the box and the shoulder, a nut on the screw, having a flange fitting over the outer end of the box, and a conical packing ring between the nut and said flange.

In testimony whereof I have signed my name to this specification in the presence of two subscribing witnesses.

JULIUS HALMASI.

Witnesses:
 SHIRLEY J. BOMMHARDT,
 A. W. LANCINGER.